United States Patent
Boughton

(10) Patent No.: US 6,802,521 B1
(45) Date of Patent: Oct. 12, 2004

(54) TRAILER WALL CONSTRUCTION

(76) Inventor: Alan Boughton, 6950 Kenderry Gate, Mississauga, Ontario (CA), L5T 2S7

(*) Notice: Subject to any disclaimer, the term of this patent is extended or adjusted under 35 U.S.C. 154(b) by 0 days.

(21) Appl. No.: 10/689,758

(22) Filed: Oct. 22, 2003

Related U.S. Application Data

(60) Provisional application No. 60/502,985, filed on Sep. 16, 2003.

(30) Foreign Application Priority Data

Oct. 8, 2003 (CA) .............................. 2444033

(51) Int. Cl.$^7$ ................................ B60J 7/00
(52) U.S. Cl. .................. 280/423.1; 280/789; 296/181; 296/36
(58) Field of Search ............................. 280/423.1, 432, 280/789, 781, 784; 296/187–189, 193, 199, 36, 181

(56) References Cited

U.S. PATENT DOCUMENTS

| | | | |
|---|---|---|---|
| 2,459,765 A | | 1/1949 | Black |
| 3,003,810 A | | 10/1961 | Kloote et al. |
| 3,796,457 A | * | 3/1974 | Hinchliff ................. 296/182.1 |
| 4,067,263 A | | 1/1978 | Naffa |
| 5,058,756 A | * | 10/1991 | Green ........................ 220/1.5 |
| 5,118,244 A | * | 6/1992 | Cook ......................... 414/528 |
| 5,154,302 A | * | 10/1992 | Alcorn ....................... 220/4.16 |
| 5,195,800 A | | 3/1993 | Stafford et al. |
| 5,423,590 A | | 6/1995 | Scullin et al. |
| 5,433,501 A | * | 7/1995 | Thomas et al. ............. 296/191 |
| 5,613,726 A | | 3/1997 | Hobbs |
| 5,876,089 A | | 3/1999 | Ehrlich |
| 5,934,741 A | | 8/1999 | Beukers et al. |
| 6,349,988 B1 | | 2/2002 | Foster et al. |
| 6,497,451 B1 | | 12/2002 | Jones et al. |
| 6,505,883 B1 | | 1/2003 | Ehrlich |
| 6,527,335 B1 | * | 3/2003 | Yurgevich ................ 296/186.1 |
| 6,682,127 B2 | * | 1/2004 | Jones et al. ............. 296/186.1 |
| 2002/0041112 A1 | | 4/2002 | Foster et al. |
| 2002/0101095 A1 | | 8/2002 | Gosselin et al. |
| 2003/0071486 A1 | | 4/2003 | Graaff et al. |
| 2003/0080583 A1 | | 5/2003 | Jones et al. |

FOREIGN PATENT DOCUMENTS

WO    WO 96/29233    *  9/1996    ........... B62D/29/04

* cited by examiner

Primary Examiner—Avraham Lerner
(74) Attorney, Agent, or Firm—Riches, McKenzie & Herbert LLP

(57) ABSTRACT

A construction for a cargo trailer side wall providing a plurality of horizontal scruff rails to extend farthest inwardly from the side wall and a plurality of post framing segments which do not extend inwardly past the scruff rails interconnecting one or more of the scruff rails and/or the floor and roof so as to provide a structural frame member reinforcing the side wall.

18 Claims, 10 Drawing Sheets

TRAILER WALL CONSTRUCTION

This application claims the benefit of Provisional Application No. 60,502,985, filed Sep. 16, 2003.

SCOPE OF THE INVENTION

This invention relates to vehicle bodies and, more particularly, to vehicle bodies such as tractor trailers which have a substantially monocoque construction.

BACKGROUND OF THE INVENTION

A wide variety of constructions are known for vehicle bodies and tractor trailers. Typical tractor trailers include a floor supported by a wheel assembly near a rear end and adapted to be supported by coupling to a trailer via a fifth wheel assembly at a forward end. Retractable front legs typically are provided on the trailer at the front forward end. Side walls extend upwardly from the floor and are coupled a roof and a front bulkhead.

In a true monocoque structured trailer, the side walls, roof and bulkhead do not utilize any supporting frame and may rely, for example, on the panels forming the side walls, roof and forward bulkhead to provide strength to the trailer. Such side walls, roof and bulkhead may preferably comprise continuous panels of fibreglass reinforced plywood. The advantage of such monocoque type construction is that the side walls are of relatively thin width as to maximize the interior width available for use inside the trailer. A disadvantage of such a monocoque construction is that the side walls are relied on to provide longitudinal support to the floor and, if cut or damaged, can result in the initial point failure which initial failure subsequently may tear or expand to result in a complete structural failure. The tendency for such failure is appreciated by the inventor as being particularly acute intermediate the wheel assembly and the fifth wheel assembly. Cutting and damage of the side walls may result unless protection is provided inside the trailer to damage by forklifts particularly forklifts with racking used to load and unload the trailers.

Many known monocoque type trailers as with fibreglass reinforced plywood in existence. These existing trailers have the disadvantage that their walls are open to be damaged as by forklifts in loading and unloading.

SUMMARY OF THE INVENTION

To at least partially overcome these disadvantages of previously known devices, the present invention provides a construction for a cargo trailer side wall providing a plurality of horizontal scruff rails to extend farthest inwardly from the side wall and a plurality of post framing segments which do not extend inwardly past the scruff rails, the framing segments interconnecting one or more of the scruff rails and/or the floor and roof so as to provide a structural frame member reinforcing the side wall.

The present invention also provides a construction for a side wall of a roof trailer including a fibreglass reinforced wall panel having a plurality of spaced horizontal scruff rails, which do not extend inwardly past the scruff rails, secured to an inner surface of the wall panel and with one or more reinforcing framing segments secured between the scruff rails or between the scruff rails and the floor or roof of the trailer to provide for a vertical structural member or a horizontal structural member over a portion of the wall.

An object of the present invention is to provide an improved construction for a cargo trailer wall which optimizes the internal space provided between side walls.

Another object is to provide in a monocoque type trailer with vertical or horizontal reinforcement of a side wall including horizontal scruff rails.

Another object is to provide a construction which is adapted to retrofit existing monocoque type trailers.

Another object is to provide, in a monocoque type trailer which includes a bottom rail along each side wall joining the side wall to the roof and a top rail along each side wall joining the side wall to the floor, a convenient structure inwardly of horizontal extending scruff rails for structurally connecting the bottom rail to the top rail.

Another object is to provide in a monocoque type trailer construction including a bottom rail along the bottom of each side wall joining each side wall to a floor, an improved construction including a horizontal scruff rail and a horizontal beam member secured between the scruff rail and a bottom rail with the beam member to not extend inwardly past the scruff rail.

Accordingly, in one aspect, the present invention provides a cargo trailer for use with a motorized vehicle, said trailer comprising:

a wheel assembly, a floor supported by said wheel assembly, two side walls extending upward from respective longitudinal sides of said floor, a roof, a front bulkhead, a bottom rail along the bottom of each side wall joining each side wall to the floor, and a top rail along the top of each side wall joining each side wall to the roof;

each side wall comprising:

a wall panel including an outer surface and an inner surface, a plurality of elongate horizontal scruff rails secured to the inner surface of the panel spaced vertically from each other, and at least one set of a plurality of vertically extending post segments, each post segment having an upper end and a lower end, a lowermost of the scruff rails spaced upwardly from the bottom rail, an uppermost of the scruff rails spaced downwardly from the top rail, each rail having an upper side portion and a lower side portion with a central rub portion therebetween extending farthest inwardly from the inner surface of the panel, each set of the post segments comprising:

a lower post segment having its lower end secured to the bottom rail and its upper end secured to the lower side portion of lowermost scruff rail, an upper post segment having its upper end secured to the top rail and its lower end secured to the upper side portion of upper most scruff rail, and intermediate post segments each having its lower end secured to the upper side portion of a scruff rail immediately there below and its upper end secured to the lower side portion of a scruff rail immediately there above, the post segments in each set disposed in line with one another to present a continuous vertically extending structural member connecting the bottom rail to the top rail via the post segments of the set and the intervening scruff rails, each post segment disposed such that most inwardly directed portions of each post segment do not extend inwardly past the central rub portion.

In a further aspect, the present invention provides a cargo trailer for use with a motorized vehicle, said trailer comprising:

a wheel assembly, a fifth wheel pickup assembly spaced forwardly from the wheel assembly, a floor supported by said wheel assembly, two side walls extending upward from respective longitudinal sides of said floor, a roof, a front bulkhead, and a bottom rail along the bottom of each side wall joining each side wall to the floor;

each side wall comprising:

a wall panel including an outer surface and an inner surface, a plurality of elongate horizontal scruff rails secured to the inner surface of the panel spaced vertically from each other, and a lowermost of the scruff rails spaced upwardly from the bottom rail, each rail having an upper side portion and a lower side portion with a central rub portion therebetween extending farthest inwardly from the inner surface of the panel, the floor comprises a plurality of spaced horizontal beams extending between the bottom rails, the wheel assembly includes bogey rails extending parallel the bottom rails under the beams, the pickup assembly includes at least one structural member extending parallel the bottom rails under the beams, each side wall including a side wall reinforcing beam member having an upper end and a lower end, the side wall reinforcing beam member having its lower end secured along its length to the bottom rail and its upper end secured along its length to the lower side portion of lowermost scruff rail, the side wall reinforcing beam member substantially spanning between a forwardmost end of the bogey rails and a rearwardmost end of the structural member of the pickup assembly, each side wall reinforcing beam member disposed such that most inwardly directed portions of each side wall reinforcing beam member do not extend inwardly past the central rub portion.

BRIEF DESCRIPTION OF THE DRAWINGS

Further aspects and advantages of the present invention will appear from the following description taken together with the accompanying drawings in which.

DETAILED DESCRIPTION OF THE DRAWINGS

Figure 1:
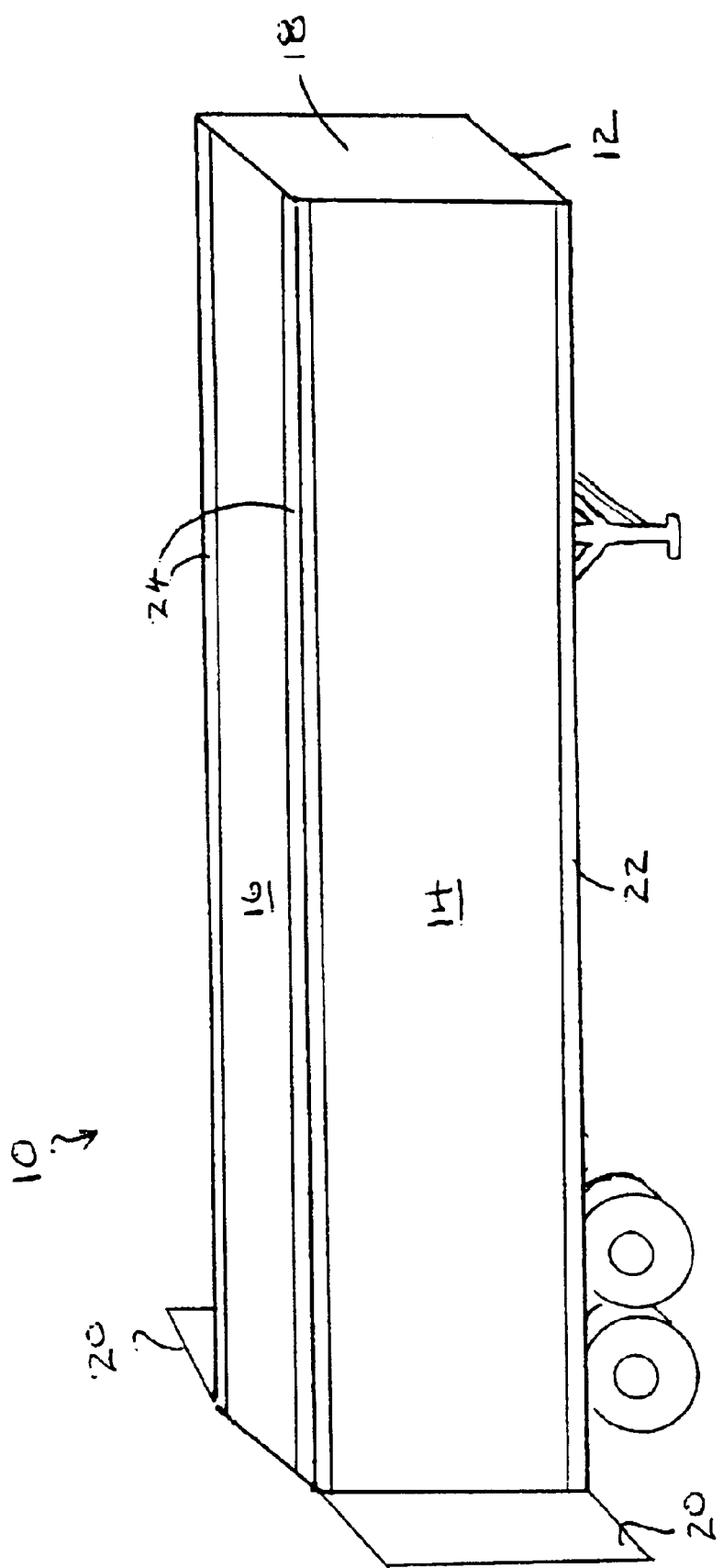
FIG. 1 is a schematic pictorial view of a trailer in accordance with a first embodiment of the invention.

Reference is made to FIG. 1 which shows a trailer 10 in accordance with a first embodiment of this invention. The body 26 of the trailer is formed by a floor 12 on which two side walls 14 are supported and joined at their top by a roof 16. A front bulkhead 18 encloses the front of the trailer and doors 20 are secured to a rear opening to the trailer to close the same. In the embodiment shown, a bottom rail 22 is provided along the bottom of each side wall joining on each side wall 14 to the floor 12. A top rail 24 extends along the top of each side wall 14 and joins each side wall 14 to the roof 16.

Figure 2:
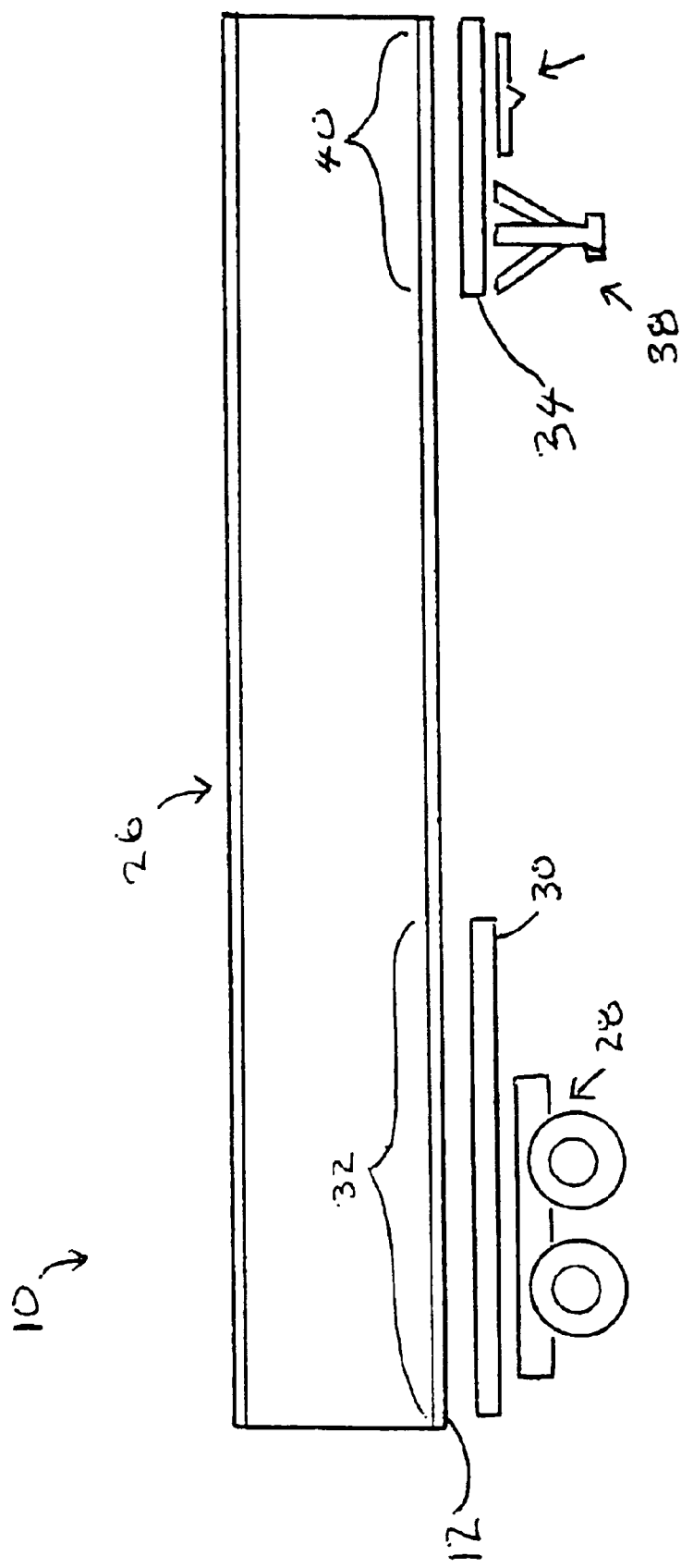
FIG. 2 is a schematic partially exploded side view of the trailer of FIG. 1.

Reference is made to FIG. 2 which shows in a schematic exploded side view the trailer of FIG. 1 as comprising a body 26 consisting of the floor, side walls, roof, front bulkhead and door and the assemblies which are used to support the body 26, namely, a wheel assembly 28 provided towards the rear and a fifth wheel assembly 36 provided towards the front. Bogey rails 30 are provided disposed between the wheel assembly 28 and the floor 12 to distribute the weight of the body 26 onto the wheel assembly 28 longitudinally over a rear portion 32 of the floor 12. A pickup plate 34 is provided under the floor 12 near the front of the trailer which pickup plate carries on one hand the fifth wheel assembly 36 for coupling of the trailer 10 to a tractor (not shown) and a retractable front leg assembly 38. The pickup plate 34 distributes the weight of the body 26 acting on the fifth wheel assembly 36 or front leg assembly 38 longitudinally over a forward portion 40 of the floor 12.

Figure 3:
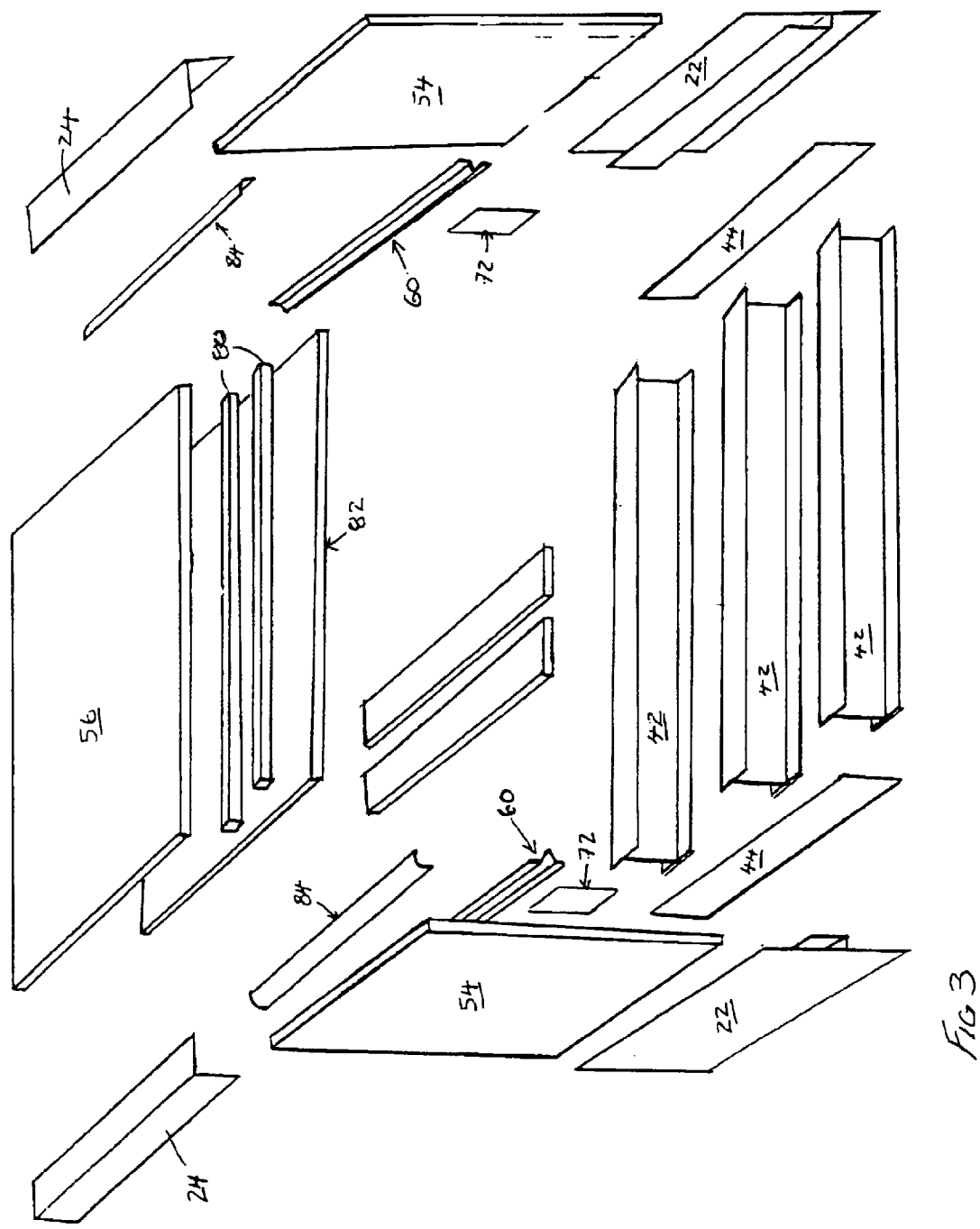
FIG. 3 is a schematic exploded end view showing the various components of the trailer body of FIG. 1.

As seen in FIG. 3 the floor 12 of the trailer 10 is constructed by a plurality of spaced horizontal beams 42 which are welded at each of their ends to a steel beam end plate 44. The floor beams 42 extend side-to-side, that is, perpendicular to a longitudinal of the trailer.

The bogey rails 30 shown in FIG. 2 may preferably comprise two horizontally extending beams extending longitudinally of the trailer transverse to the floor beams 42 and welded to the floor beams 42 so as to support the wheel assembly 28 which preferably comprises a rear bogey tandem axle arrangement. The pickup plate 34 may preferably comprise at least two longitudinally extending beam members underneath the floor beams 42 and welded to the floor beams 42 which beams preferably carry a plate on which the fifth wheel assembly 36 and the front leg assembly 38 may be mounted.

Figure 5:
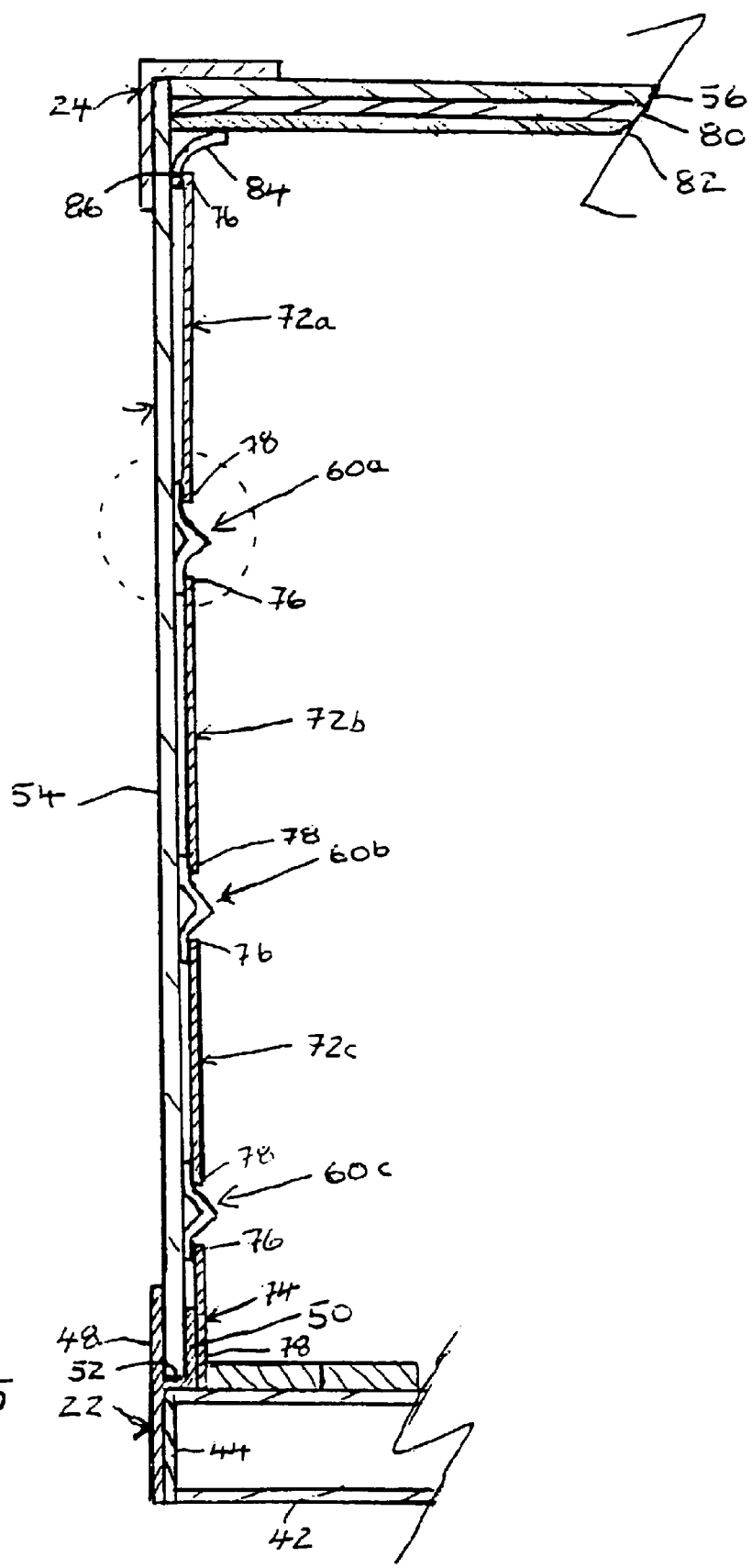
FIG. 5 is a cross-sectional end view through the trailer along section line 5–5' in FIG. 4.

As best seen in FIG. 5, the bottom rail 22 is of a "J" shape having an outer flange plate 48 with a lower portion secured outward of and adjacent the beam end plate 44. The bottom rail 22 includes an inner flange plate 50 spaced inwardly from the outer flange plate 48 and joined thereto by a shoulder 52. As best seen in FIG. 5, the shoulder 52 rests on top of the floor beams 42 with the inner flange plate 50 and an upper portion of the outer flange plate 48 forming an upwardly opening channel therebetween within which a wall panel 54 is received. The wall panel 54 is preferably fibreglass reinforced plywood which comprises a centre layer of plywood which has fibreglass applied to its surfaces as a fibreglass webbing and as a fibreglass resin. Each side panel 54 preferably comprises a unitary element which extends the entire length of the trailer. The roof 16 includes a similar roof panel 56 also formed preferably of fibreglass reinforced plywood as a unitary member that extends the length of the trailer.

A top rail 24 is shown a right angle member which has one vertical leg secured to the outside of the wall panel 54 adjacent an upper edge of the wall panel 54 and a second leg secured over the roof panel 56 adjacent a side edge of the roof panel 54. The top rail 24 is secured to each of the wall panel 54 and roof panel 56 by adhesives and/or suitable fasteners such as bolts, screws and rivets not shown.

The bottom rail 22 preferably is metal as, for example, steel or aluminum and may comprise an aluminum extrusion.

The top rail 24 preferably is metal as, for example steel or aluminum and may comprise an aluminum extrusion.

Figure 4:
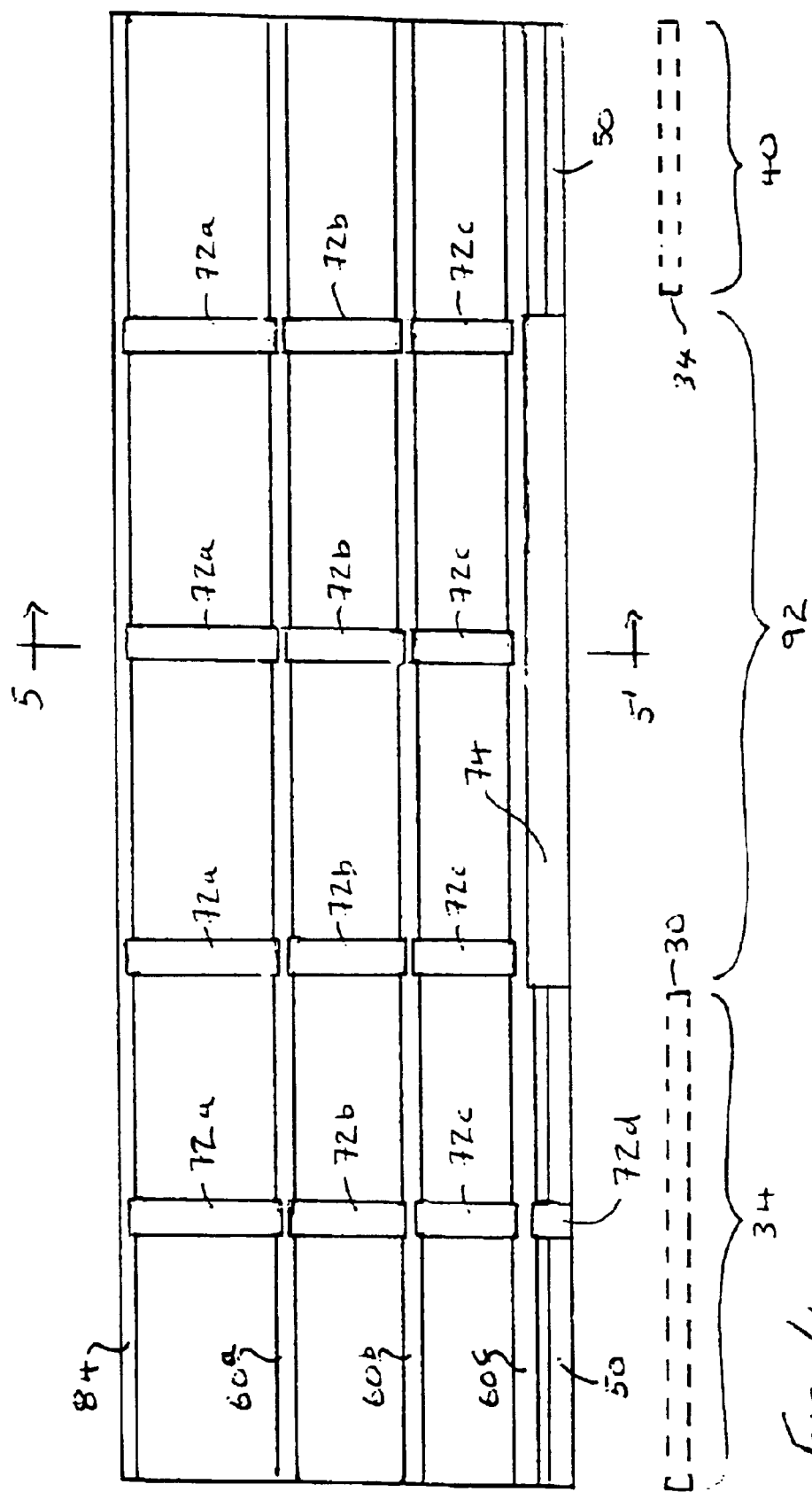
FIG. 4 is a schematic side view of the interior of the trailer of FIG. 1 showing the interior of one side wall between the roof and the floor and schematically showing the location of the bogey rails and the pick up rails.

The wall panels 54 and roof panel 56 have an inner surface 58 and an outer surface 59. As best seen in FIGS. 3, 4 and 5, three horizontally extending vertically spaced scruff rails 60 are secured to the inner surface 58 of the wall panel 54. Preferably each scruff rail extends along the entire length of the wall panel 54. Each scruff rail 60 has an upper side portion 62, a lower side portion 64 and a central rub portion 66 intermediate the upper side portion 62 and lower side portion 64. The scruff rail 60 preferably is formed from metal, preferably steel, as from a flat plate so as to provide the upper side portion 62 and lower side portion 64 as planar portions which are co-planar and with the central rub portion 66 bent to portion extend inwardly from the side portions.

Figure 6:
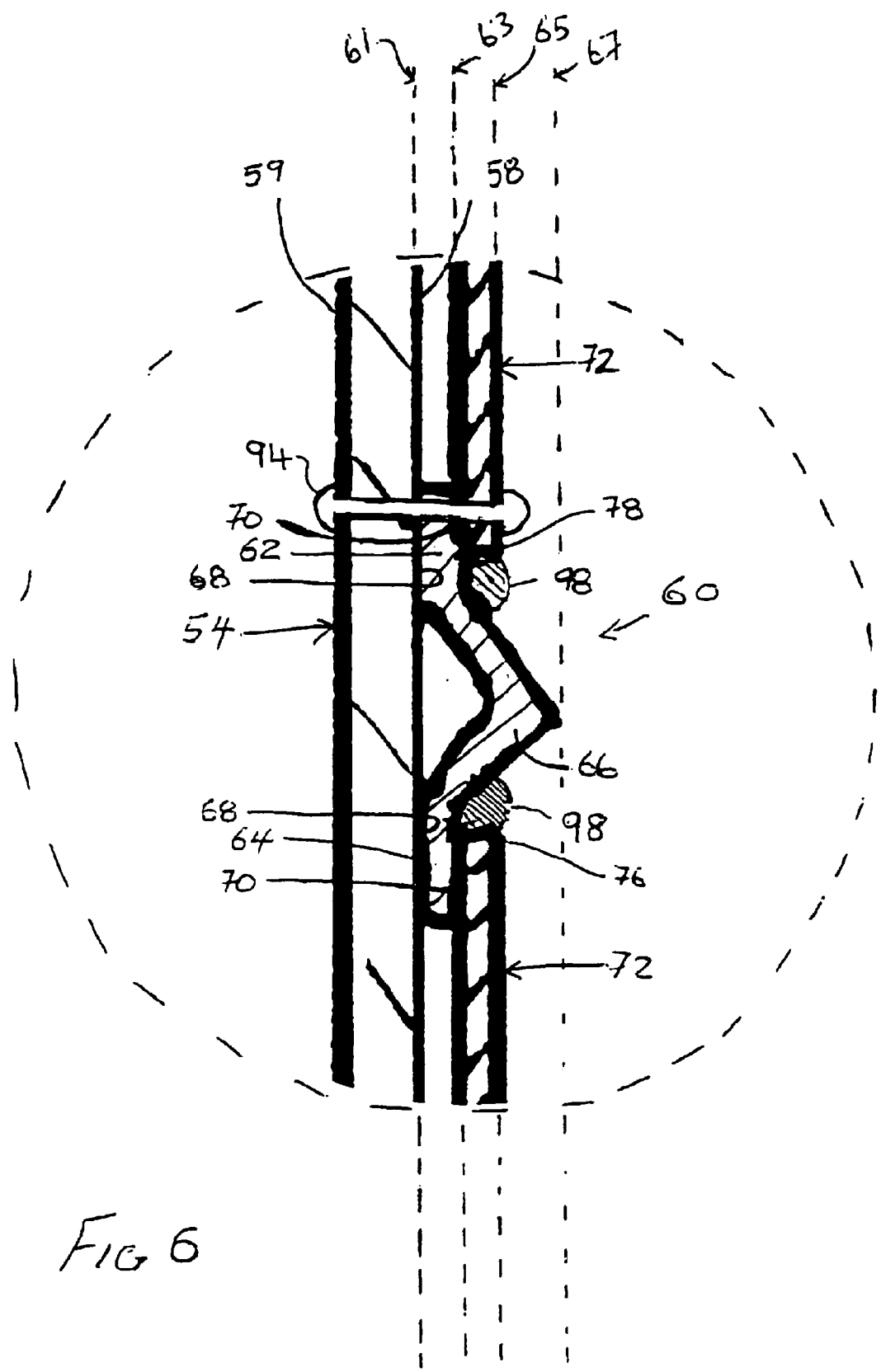
FIG. 6 is an enlarged cross-sectional side view showing an end of a scruff rail as seen in FIG. 5.

As best seen in FIG. 6, the upper side portion 62 and the lower side portions 64 of the scruff rail 60 have outer surfaces 68 which lie in the same "outer" plane 61 co-planar with the inner surface 58 of the wall panel 54 and are adapted to engage the inner surface 58 of the wall panel 54. Each of the upper side portion 62 and lower side portion 64 have an inner surface 70 lying in the same "inner" plane indicated as 63 in FIG. 6 parallel to the outer plane but inward from the outer plane 61 and spaced outwardly from the innermost surfaces of the central rub portion 66. As best seen in FIG. 5, with the different scruff rails 60 being substantially identical, the central rub portion 66 has innermost surfaces which are disposed in a vertical common plane indicated as 67 in FIG. 6 and disposed inwardly of the inner plane 63.

The roof 16 comprises the exterior roof panel 56, a plurality of horizontal side-to-side extending roof bows 80 secured to the underside of the roof panel 56 and protective thin metal roof sheet 82 secured to the underside of the roof bows. Thus the roof a sandwich construction with the roof bows 80 between the roof panel 56 and the roof sheet 82.

As best seen in FIG. 5, an upper inner corner scruff rail 84 is provided to extend between the wall panel 54 and the roof 16 at their inner corner juncture. The corner scruff rail 84 has a lower side portion 86 substantially identical to the lower side portion 64 of a scruff rail.

As best seen in FIGS. 4 and 5, enhancing reinforcing is provided to the side wall 14 by reason of reinforcing framing segments generally indicated 72 and 74 with 72 referring generally to post segments and 74 referring to a beam segment Each of the framing segments 72 and 74 are shown as a planar sheet of material, preferably of metal, preferably steel. Each has an upper end 76 and a lower end 78.

Each of the framing segments 72 and 74 has its upper end 76 secured to either the lower side portion 64 of a scruff rail or the lower side portion 86 of the corner scuff rail 84. The lower end 78 of each of the framing segments 72 and 74 is secured to either the upper side portion 62 of a scruff rail 60 or the inside flange plate 50 of the bottom rail 22. The inside flange plate 50 of the bottom rail 52 preferably has a thickness equal to the thickness of the lower side plate 64 of the scruff rail 60 and therefore extends inwardly from the wall panel 54 the same distance to also lie in inner plane 63. As such, as shown in the preferred embodiment, inner surfaces of each of the inner flange plate 50, upper and lower side portions of the scruff rail 60 and the lower side portion 86 of the corner scuff rail 84 all lie in the same inner plane 63. This inner plane 63 is spaced inwardly from the common plate 67 to which the central rub portion 66 extends by a distance which is at least equal to, however, is preferably greater than the thickness of the framing segments 72 and 74 such that, as is preferred and shown in the preferred embodiment in FIG. 5, each framing segment 72 and 74 is disposed with the most inwardly direct portions of each frame segment in a fraying plane 65, to not extend inwardly as far as the central rub portions 66 of the scruff rail 60.

As best seen in FIG. 4, the framing segments are effectively arranged in four sets. Each set of post segment comprises an upper post segment 72a having its upper end 76 secured to the lower side portion 86 of the corner scuff rail 84 and its lower end 78 secured to the upper side portion 62 of the uppermost scruff rail 60a. Two intermediate post segments 72b and 72c are provided each having its upper end 76 secured to the lower side portion 64 of a scruff rail 60 immediately thereabove and its lower end 78 secured to the upper side portion 62 of a scruff rail 60 immediately therebelow. Each set further includes a lowermost framing segment. In respect of the rearward most set of framing segments as seen in FIG. 4 above the bogey rails 30 a lowermost post segment 72d has its upper end secured to the lower side portion of the lowermost scruff rail 60c and its lower end secured to the inner flange plate 50 of the bottom rail 22. For the three sets forward of the rearward most set, the lowermost post segment is effectively provided by the beam segment 74 having its upper end 76 secured to the lower side portion of the lowermost scruff rail 60c and it lower end 78 secured to the inner flange plate 50 of the bottom rail 22.

Figure 7:
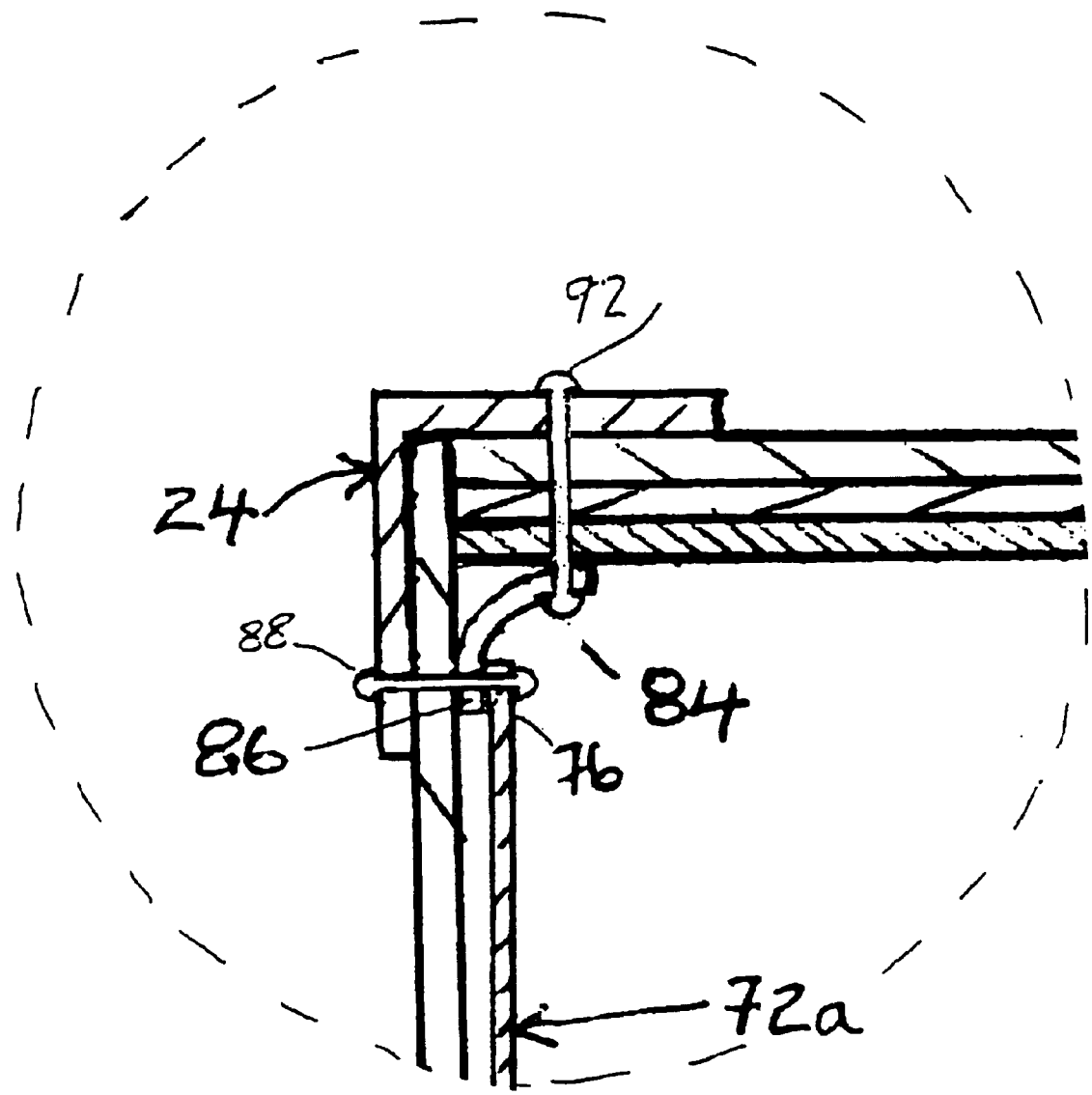
FIG. 7 is an enlarged cross-sectional side view showing an end of the scuff rail and top rail as seen in FIG. 5.
Figure 8:
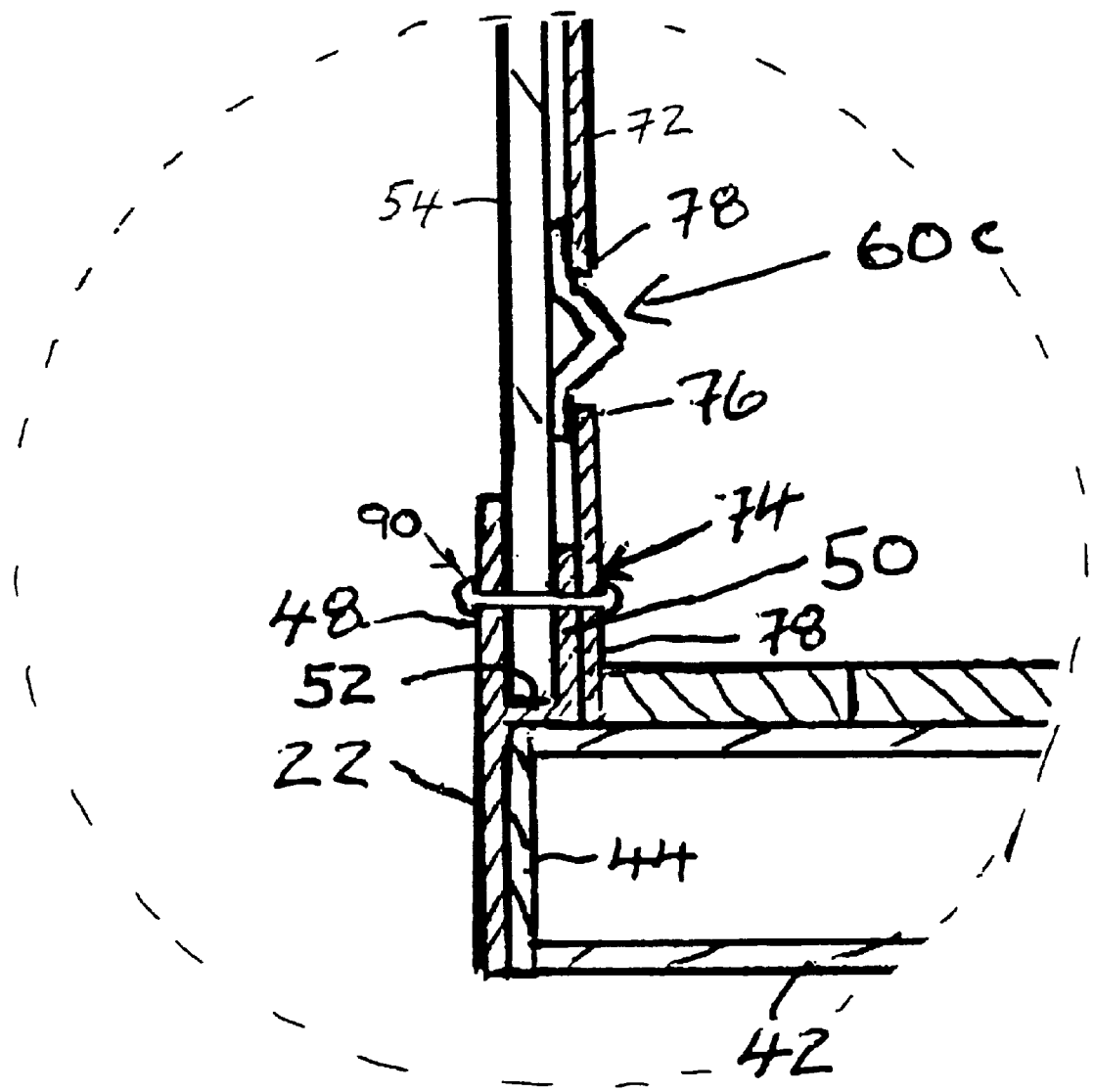
FIG. 8 is an enlarged cross-sectional side view showing an end of the bottom rail as seen in FIG. 5.

As seen only in FIG. 7, the uppermost post segment 72a is preferably secured to the top rail 24 by a mechanical fastener such as rivet or bolt 88. Similarly, as seen in FIG. 8 the beam segment 74 is secured to the bottom rail 22 via rivet or bolt 90.

The manner of securing the frame segments 72 and 74 to the scruff rail 60, corner scuff rail 84 and the bottom rail 22 may include various arrangements including welding, gluing, riveting, bolting and the like. In the preferred embodiment, the frame segments 72 and 74 and the scruff rail 60 comprising steel, they may be secured together by welding and weld joints are indicated in FIG. 6 as 98. FIG. 6 also shows one rivet 94 to secure the frame segments 72 scruff rail 60 together and the wall panel 54 together. Insofar as the bottom rail comprises aluminum then, preferably, the bottom rail may be electrically isolated from the steel frame segments 70 and 72 and scruff rail 60 to reduce galvanic corrosion as by providing an electrically non-conducting, elastomeric membrane therebetween and/or electrically insulating grommets about any rivets and/or bolts. Similarly, insofar as the uppermost post segment 72 and the top rail 24 may be of different metals, then they may also be kept electrically isolated from each other.

As seen in FIG. 4, four sets of vertically arranged framing segments are provided with the framing segments in each set disposed in line with one another to present a continuous vertically extending structural member connecting the bottom rail 22 to the top rail 24 via the framing segments 72 and/or 74 of each set and the intervening scruff rails 60.

The scruff rails 60 extend inwardly and provide the central rub portion 66 for engagement with articles to be inserted into and removed from the interior of the trailer 10. The central rub portion 66 of scruff rail serve as a scuff surface for engagement with pallets, machinery and the like to assist in guiding and sliding the same into and out of the trailer interior while protecting the wall panels 54 from damage. The framing segments 72 and 74 preferably as shown are recessed inwardly from the common plane 67 in which the central rub portion 66 of the scruff rails lie so as to avoid engagement by pallets, machinery and the like being moved in and out of the trailer interior. The particular construction shown provides for reinforcement of the side wall 14 with the framing segments in a manner which does not increase the extent to which the scruff rails 60 extend inwardly.

Referring to FIG. 4, the beam segment 74 serves as a lowermost post segment for each of three of the sets of framing segments. In this context, insofar as the beam segment 74 is provided vertically below the post segment 72, the beam segment 74 serves a purpose as being an inline post segment of that set. The beam segment 74 however also serves another purpose as a horizontal extending reinforcing beam.

As best seen in FIG. 4, the beam segment 74 extends longitudinally of the trailer over a substantial portion of the longitudinal span between the bogey rails 30 and the pickup plate 34. In this regard, as seen in FIG. 4, the bogey rails underlie a rear portion 34 of the floor and the pickup plate 34 underlies a forward portion 40 of the floor. This leaves a middle portion 92 of the floor which is not supported by underlying longitudinally extending members. The beam segment 74 structurally reinforces the side wall 14 and thereby the floor 12 as a longitudinally extending beam substantially over the middle portion 92 by reason of the secured connection along the upper end 76 of the beam segment 74 to the lower side portion 64 of the lowermost scruff rail 60a and the secured connection along the lower end 78 of the beam segment 74 to the inner flange plate 50 bottom rail 22. The beam segment 74 is preferably mechanically coupled to the bottom rail 22 via bolt 90 as seen only in FIG. 8. The beam segment 74 is preferably metal and, preferably steel, and is preferably secured to the lower side portion 64 of the lowermost scruff rail 60 as by welding.

Figure 10:
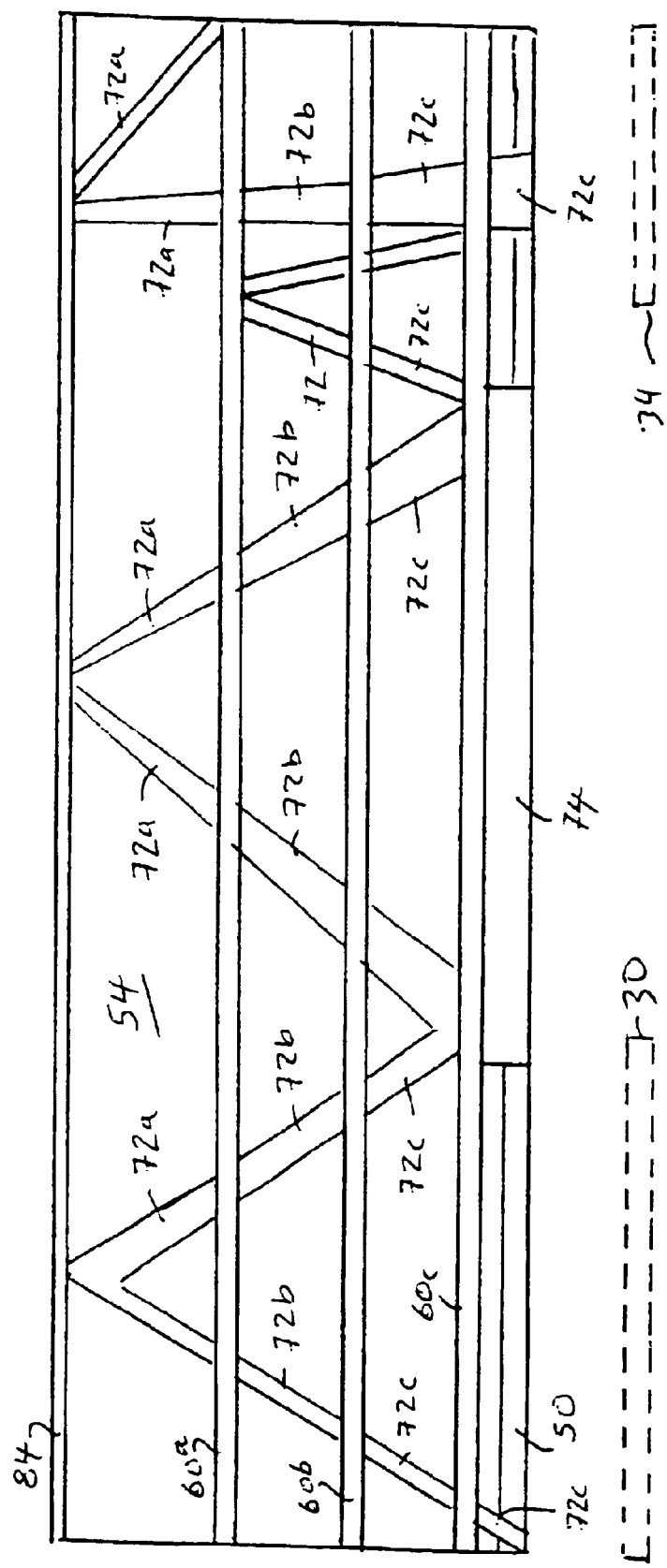
FIG. 10 shows a side view of the interior side of a trailer similar to that of FIG. 4, however, of a second embodiment.

Reference is made to FIG. 10 which shows a second embodiment of the present invention. In the embodiment of FIG. 10, the framing segments include post segments 72 which, rather than merely extending vertically as illustrated in FIG. 4, are arranged in line with each other, however, at angles to the vertical as to provide, in effect, a truss-like structure for increased rigidity. As shown, the framing segments 72 may be of constant width or may have varying widths over their length. They may be arranged intermediate the scruff rails 60, or between the lower scruff rail 60 and the bottom rail 22 or between the upper scruff rail 60 and the corner scruff rail 74 as may be desired to provide for vertical posts or angled trusses or horizontal beams wherever the same may be desired throughout the height and width of the wall panel. The resultant vertical posts need not extend the full height of the trailer. By selecting the width and thickness of the framing segments, the overall weight of the framing segments can be adjusted having regard to desired strength of the framing provided.

The preferred embodiment of this invention as shown in FIG. 1 illustrates a bottom rail 22 which includes a shoulder 52 and an inner flange plate 50. This is not necessary. Both the inner flange 50 and the shoulder 52 of the bottom rail 22 could be eliminated and, for example, an additional scruff rail 60 could be provided proximate the floor or a scuff rail similar to scuff rail 84 could be provided at the lowermost corner adjacent the floor. In either case, a beam segment 74 or lowermost post segment 72c could be secured to such a scruff rail 60 and preferably also secured to the bottom rail 22.

The preferred embodiment illustrated shows both a top rail 24 and a corner scuff rail 84 at the top corner where the side walls 14 join the roof This is not necessary. Either one of the top rail 24 or the scuff rail 84 could be eliminated or both could be eliminated. It is preferred, however, to have at least one of the top rail 24 or the scuff rail 84 and with each mechanically coupled to both the wall panel 54 and the roof panel 56 as by bolts or rivets 88 and 92 as shown only in FIG. 7. Where either one of the top rail 24 and corner scuff rail 84 are provided, it is preferred that each set of post segments have an uppermost post segment 72a secured at its upper end to the top rail 24 or scuff rail 84.

In accordance with the present invention, it is preferred that each set of framing segments span between the roof and the floor as by connection at their bottom to the bottom rail 22 and at the top, to the top rail 24. This is not necessary, however, and reinforcement of the body 24 can be accomplished with framing segments extending only partially between the floor 12 and the roof 16 as seen in FIG. 10.

In the preferred embodiment, the roof is illustrated as having a composite structure including exterior roof panel 56, roof bows 80 and the interior roof sheet 82. Providing the interior roof sheet 82 is preferred so as to provide a smooth scuff surface which will permit articles to be moved into and out of the trailer without catching. The roof bows provide increased strength to the roof. Neither the roof bows 80 nor the roof sheet 82 is necessary.

In accordance with the preferred embodiment as illustrated in FIG. 5, the central rub portion 66 of the scruff rail 70 extends farther into the interior than any other portion of the side walls 14 and, particularly, the framing portions 72 and 74 are recessed inwardly from the central rub portion 66. This is preferred such that the framing segments 72 and 74 or at least their vertical edges are less likely to be caught or engaged with articles being loaded and unloaded into the interior of the trailer. However, it is in accordance with the present invention that other members of the side walls 14 such as the beam segment 74 and/or the post segment 72 may extend as far inwardly as the central rub portion 66, that is to the common plane 67.

In accordance with the preferred embodiment, the wall panel 54 and the roof panel 56 comprise fibreglass reinforced plywood. This is preferred however any other comparable structural material may be utilized in substitution therefore as, for example, unreinforced plywood, other laminate materials, honeycombed metal and plastic composites. As one example, rather than have the wall panel 54 provided as a unitary panel over the entire length of the trailer, it would be possible to form the wall panel 54 from a plurality of similar panels with each panel abutting the end of another panel with the abutment joint disposed behind a set of post segments 72 such that the ends of two panels meet at an abutment joint and each end may each be bolted or riveted or otherwise fastened to the post segments 72.

In discussion of the preferred embodiments, reference has been made to various rivets or bolts 88, 90, 92 and 94 which may be used to secure the framing segment 72 and 74 as to the upper and lower side portions of the scruff rails and to the scruff rail 84 and to the bottom rail 22 and the top rail 24. In accordance with the present embodiment, it is desired that as seen in FIG. 6 the heads of any such bolts, rivets or other mechanical fasteners such as 94 do not extend inwardly beyond the common plane 67 in which the central rub portion 66 lies and, preferably, the heads of any such fasteners will be recessed outwardly from common plane 67. Weld joints such as 98 in FIG. 6 are preferred since they do not extend inwardly.

In accordance with the present invention, the scruff rail 60 has been shown as providing a central rub portion of relatively small vertical extent. It is to be appreciated, however, that a similar scruff rail 60 could be provided as with similar upper and lower side portions, however, with a series of corrugations therebetween so as to provide as a plurality of surface portions, in the common plane, a central rub portion over an extended height as, for example, possibly over the quarter of the wall panel 54. Use of such an expanded vertical dimension scruff rails does not detract from the use of the framing structure 72 and 74 in accordance with the present invention.

Figure 9:
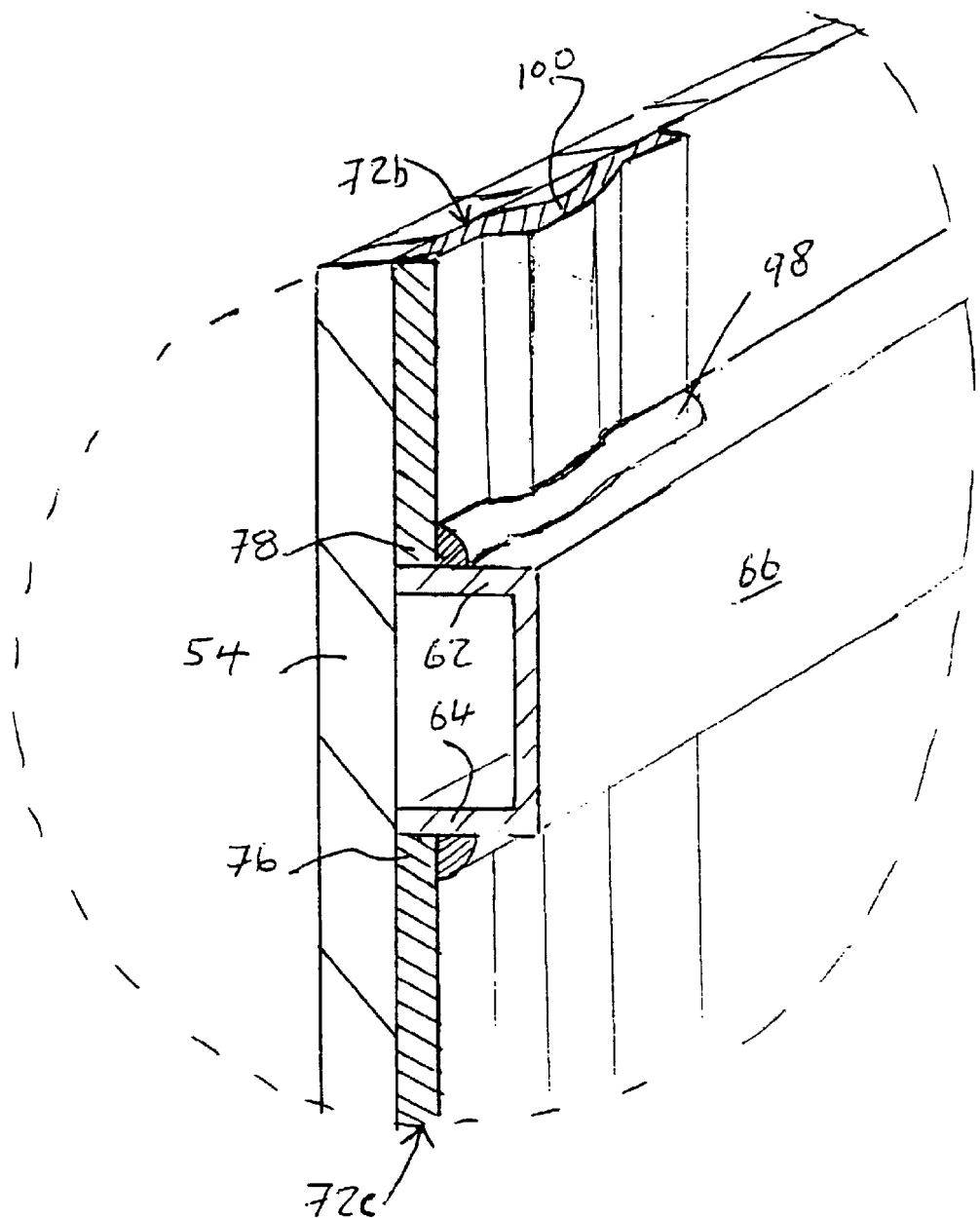
FIG. 9 is a side view similar to FIG. 6 but of a second embodiment of a scruff rail in accordance with this invention.

Reference is made to FIG. 9 which shows a second embodiment of a wall in accordance with the present invention in a side view similar to FIG. 6. In FIG. 9 the scruff rail 60 is U-shaped with the central rub portion 60 flat, and with each of the upper and lower side portions 62 and 64 being horizontal. The framing segments 72 are shown as having their upper and lower ends 76 and 78 abutting the side portions 62 and 64 and welded thereto the side portions of the scruff rail 60 by welds 98. The framing segments 72 have cross-section including a vertically extending reinforcing rib 100 which does not extend inwardly as far as the central rub portion 66.

While the invention has been described with reference to preferred embodiments, many variations and modifications will now occur to persons skilled in the art. For a definition of the invention, reference is made to the appended claims.

What is claimed is:

1. A cargo trailer for use with a motorized vehicle, said trailer comprising:
   a wheel assembly,
   a floor supported by said wheel assembly,
   two side walls extending upward from respective longitudinal sides of said floor,
   a roof,
   a front bulkhead,
   a bottom rail along a bottom of each side wall joining each side wall to the floor, and
   a top rail along a top of each side wall joining each side wall to the roof; each side wall comprising:
   a wall panel including an outer surface and an inner surface,
   a plurality of elongate horizontal scruff rails secured to the inner surface of the wall panel spaced vertically from each other, and
   at least one set of a plurality of vertically extending post segments,
   each post segment having an upper end and a lower end,
   a lowermost of the scruff rails spaced upwardly from the bottom rail,
   an uppermost of the scruff rails spaced downwardly from the top rail,
   each scruff rail having an upper side portion, a central rub portion and a lower side portion with the central rub portion between the upper side portion and the lower side portion and extending farthest inwardly from the inner surface of the wall panel, each set of the post segments comprising:
   a lower post segment having its lower end secured to the bottom rail and its upper end secured to the lower side portion of the lowermost scruff rail,
   an upper post segment having its upper end secured to the top rail and its lower end secured to the upper side portion of upper most scruff rail, and
   at least one intermediate post segment having its lower end secured to the upper side portion of a scruff rail immediately therebelow and its upper end secured to the lower side portion of a scruff rail immediately thereabove,
   the post segments in each set disposed in-line with one another to present a continuous vertically extending structural member connecting the bottom rail to the top rail via the post segments of the set and the intervening scruff rails,
   each post segment disposed such that most inwardly directed portions of each post segment do not extend inwardly past the central rub portion.

2. A cargo trailer as claimed in claim 1 wherein the wall panel comprises fibreglass reinforced plywood, the central rub portion of the scruff rails on each side wall is disposed in a common plane,
most inwardly directed portions of each post segment on each side wall do not extend inwardly past the common plane.

3. A cargo trailer as claimed in claim 2 wherein the central rub portion of the scruff rails on each side wall is disposed in a common plane,
most inwardly directed portions of each post segment on each side wall are recessed outwardly from the common plane.

4. A cargo trailer as claimed in claim 3 wherein each scruff rail and each post segment are formed from metal and are secured together by welding.

5. A cargo trailer as claimed in claim 3 wherein each scruff rail and each post segment are made of metal and are secured together by welding,
each bottom rail and top rail is also made of metal.

6. A cargo trailer as claimed in claim 1 wherein the central rub portion of the scruff rails on each side wall is disposed in a common plane,
each of the upper side portion and the lower side portion of each scruff rail having an outer surface lying in a same outer plane and engaging the inner surface of the wall panel,
each of the upper side portion and the lower side portion of each scruff rail having an inner surface lying in a same inner plane parallel to the outer plane inward from the inner plane but spaced outward from the common plane, the post segments having an outer surface and an inner surface with a distance there between less than a distance from the inner plane and the common plane, the post segments secured to the respective upper and lower side portions of the scruff rails with the outer surface of the post segments in overlapping engagement with the inner surfaces of the upper and lower side portions of the scruff rails.

7. A cargo trailer as claimed in claim 6 wherein the post sections comprise a planar sheet of metal.

8. A cargo trailer as claimed in claim 1 further including a fifth wheel pickup assembly spaced forwardly from the wheel assembly, the floor comprises a plurality of spaced horizontal beams extending between the bottom rails, the wheel assembly includes bogey rails extending parallel the bottom rails under the beams, the pickup assembly includes at least one structural member extending parallel the bottom rails under the beams, each side wall including a side wall reinforcing beam member having an upper end and a lower end, the side wall reinforcing beam member having its lower end secured along its length to the bottom rail and its upper end secured along its length to the lower side portion of lowermost scruff rail, the side wall reinforcing beam member substantially spanning between a forwardmost end of the bogey rails and a rearwardmost end of the structural member of the pickup assembly, each side wall reinforcing beam member disposed such that most inwardly directed portions of each side wall reinforcing beam member do not extend inwardly past the central rub portion.

9. A cargo trailer as claimed in claim 8 wherein each side wall reinforcing beam member comprises a lower post segment of at least one set of the post segments.

10. A cargo trailer as claimed in claim 9 wherein each side wall reinforcing beam member comprises a planar sheet of metal.

11. A cargo trailer as claimed in claim 10 wherein each scruff rail is formed from a planar sheet of metal with the central rub portion extending inwardly of the upper and lower side portions which are co-planar.

12. A cargo trailer as claimed in claim 1 wherein the bottom rail has a lower portion disposed laterally outwardly of the floor and an upper portion rising above the floor adjacent the wall panel.

13. A cargo trailer as claimed in claim 12 wherein the upper portion of the bottom rail includes an inner leg inward of the wall panel adjacent thereto, the lower post segment having its lower end secured to the bottom rail to lie inwardly of the inner leg, the inner leg and lower end of the lower post segment having a combined thickness that most inwardly directed portions of the lower post segment do not extend inwardly past the central rub portion.

14. A cargo trailer as claimed in claim 13 wherein the upper portion of the bottom rail includes an outer leg outward of the wall panel adjacent thereto, the outer leg and inner leg forming an upwardly open channel with a horizontal base within which channel the lower end of the wall panel is secured.

15. A cargo trailer as claimed in claim 2 wherein the roof comprises a roof panel of fibreglass reinforced plywood spanning between the two side walls.

16. A cargo trailer as claimed in claim 2 wherein the roof comprises:

an upper, outer roof panel of fibreglass reinforced plywood spanning between the two side walls, a plurality of horizontally extending roof beam members spanning between the side walls, and the roof beam members disposed between the outer roof panel and the inner sheet.

17. A cargo trailer as claimed in claim 6 wherein the bottom rail and floor beams comprise aluminum and the scruff rails and post sections comprise steel, the lower end of the lower post sections secured to the bottom rail insulated from the bottom rail to reduce against galvanic corrosion therebetween.

18. A cargo trailer for use with a motorized vehicle, said trailer comprising:

a wheel assembly, a floor supported by said wheel assembly, two side walls extending upward from respective longitudinal sides of said floor, a roof, and a bottom rail along a bottom of each side wall joining each side wall to the floor; each side wall comprising:

a wall panel including an outer surface and an inner surface, a plurality of elongate horizontal scruff rails secured to the inner surface of the wall panel spaced vertically from each other, and at least one set of frame segments, a lowermost of the scruff rails spaced upwardly from the bottom rail, an uppermost of the scruff rails closest the roof, each scruff rail having an upper side portion, a central rub portion and a lower side portion with the central rub portion between the upper side portion and the lower side portion and extending farthest inwardly from the inner surface of the wall panel, each frame segment having an upper end and a lower end, each set of the frame segments comprising:

a lower frame segment having its lower end secured to the bottom rail and its upper end secured to the lower side portion of the lowermost scruff rail, an upper frame segment having its lower end secured to the upper side portion of upper most scruff rail, and at least one intermediate frame segment having its lower end secured to the upper side portion of a scruff rail immediately therebelow and its upper end secured to the lower side portion of a scruff rail immediately thereabove, the frame segments in each set disposed in-line with one another to present a continuous extending structural member connecting the bottom rail and scruff rails via the frame segments of the set, each frame segment disposed such that most inwardly directed portions of each frame segment do not extend inwardly past the central rub portion.

* * * * *